J. T. RONAN.
MAGNETIC TRANSMISSION GEARING.
APPLICATION FILED FEB. 13, 1917.
1,316,110.
Patented Sept. 16, 1919.
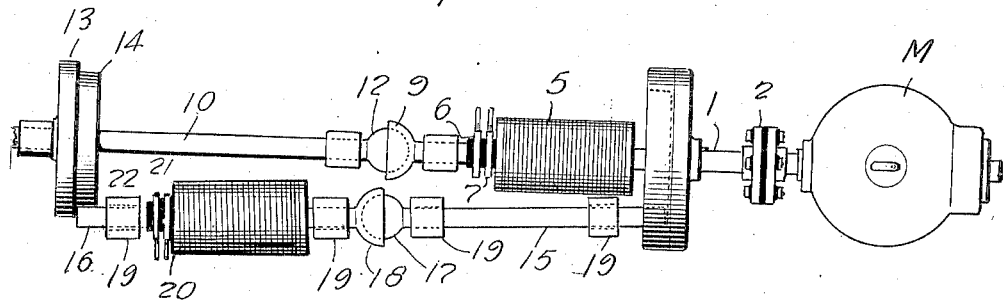
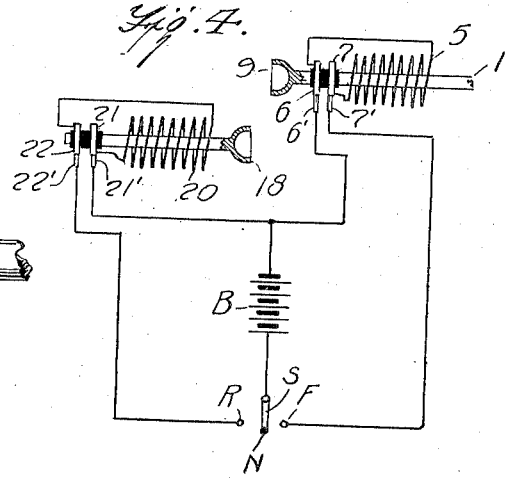
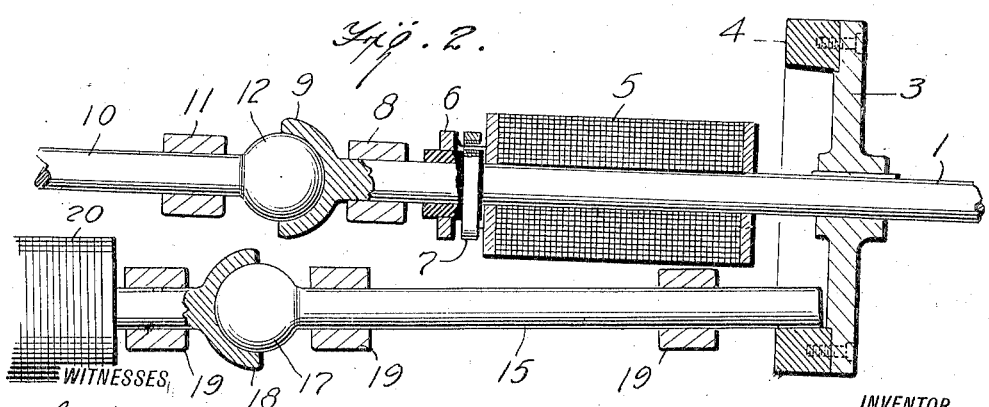
INVENTOR
JOHN T. ONAN,
BY
ATTORNEYS

UNITED STATES PATENT OFFICE.

JOHN T. RONAN, OF LUDWIG, NEVADA.

MAGNETIC TRANSMISSION-GEARING.

1,316,110.  Specification of Letters Patent.  Patented Sept. 16, 1919.

Application filed February 13, 1917. Serial No. 148,408.

*To all whom it may concern:*

Be it known that I, JOHN T. RONAN, a citizen of the United States, and a resident of Ludwig, in the county of Lyon and State of Nevada, have invented a certain new and useful Improvement in Magnetic Transmission-Gearing, of which the following is a specification.

My invention relates to improvements in magnetic transmission gearing, and it consists in the combinations, constructions, and arrangements herein described and claimed.

An object of my invention is to provide a magnetic transmission gearing of relatively simple construction, in which the few parts cannot readily get out of order.

A further object of my invention is to provide a device of the type described having a simple electrical control circuit.

Other objects and advantages will appear in the following specification, and the novel features of the invention will be particularly pointed out in the appended claims.

My invention is illustrated in the accompanying drawings forming a part of this application, and in which;

Figure 1 is a plan view of the device;

Fig. 2 is a section through one end of the device;

Fig. 3 is a section through a portion of the opposite end of the device, and

Fig. 4 is a diagrammatic view of the circuit.

In the drawings M denotes a motor which may be of any suitable type. It is connected with the main driving shaft 1 by an insulating joint 2. Mounted on the shaft 1 is a wheel 3 preferably made of aluminum, there being a ring 4 of magnetic material secured to the wheel 3 on one side thereof. A magnet 5 is disposed above the shaft 1, the latter being designed to form the core of the magnet as explained later.

The terminal wires of the magnet 5 are connected with the collector rings 6 and 7 mounted on the shaft 1, which are pressed upon by brushes 6' and 7' respectively. The shaft 1 has a suitable bearing 8, and just beyond this bearing it terminates in a spherical socket 9.

The driven shaft 10 has one end supported in the bearing 11, and terminates in a ball 12 arranged to enter the spherical socket 9 thus providing a universal joint. To the opposite end of the shaft 10 is secured a wheel 13 having a ring 14 of magnetic material secured thereto in the manner shown.

At 15 I have shown an auxiliary drive shaft, and at 16 an auxiliary driven shaft. The shaft 15 is provided with a spherical end 17 which is arranged to enter a socket 18 on the shaft 16. Suitable bearings 19 are provided. One end of the shaft 15 extends forwardly into engagement with the magnetic ring 4, see Fig. 2, while the shaft 16 is in engagement with the magnetic ring 14, see Fig. 3.

B in Fig. 4 represents the source of current, which may be any suitable source. At S I have shown a controller which is designed to be stationed on the bridge. The controller arm is designed to rest on either of three points, the point F giving a forward motion, the point N being the neutral point, and the point R giving the reverse motion.

Consider the action when the controller arm S is on the point F. The current will flow through the coil of the magnet 5, and this will magnetize the shafts 1 and 10 so as to cause their ball and socket connections to grip each other firmly, thereby transmitting the motion of the shaft 1 to the shaft 10, that is to say, there will be forward direct motion transmitted.

If the control arm S be shifted to the neutral position, neither of the clutches will be brought into operation, so that the motor will turn idly. When the switch arm S is moved to the point R, then the coil of the magnet 20 whose terminals are connected to the collector rings 21 and 22 respectively, will be energized, thereby causing the magnetic clutch members 17 and 18 to grip each other firmly so as to transmit the movement of the wheel 3 to the shaft 15, thence to the shaft 16, and to the wheel 13, through the medium of the magnetic rings 4 and 14, and the friction between said rings and the shafts 15 and 16 respectively. This gives a reverse movement to the driven shaft 10.

I claim:

1. In a magnetic transmission gearing, a drive shaft, a driven shaft in alinement with said drive shaft, an auxiliary drive shaft, an auxiliary driven shaft in alinement with said auxiliary drive shaft, a universal joint connecting said drive shaft with said driven shaft, a universal joint connecting said auxiliary drive shaft with said auxiliary driven shaft, means for rendering magnetic the parts of said universal joints at will, said auxiliary shaft being angularly disposed with respect to said drive shaft, means carried by said drive shaft for actuating said auxiliary drive shaft, and means carried by said auxiliary driven shaft for actuating the first named driven shaft.

2. A magnetic transmission gearing comprising a drive shaft, a driven shaft, a magnetic clutch for connecting said shafts composed of parts having a universal movement, an auxiliary drive shaft, an auxiliary driven shaft, a magnetic clutch for connecting said auxiliary shafts composed of parts having a universal movement, a friction wheel carried by said first named drive shaft and arranged to engage said second named drive shaft, a friction wheel carried by said first named driven shaft and arranged to be engaged by said second named driven shaft, and means for energizing either of said magnetic clutches at will, said means comprising a magnetic coil carried by said drive shaft, the core of the coil being the drive shaft.

3. A magnetic transmission gearing comprising a drive shaft, a driven shaft, a magnetic clutch having ball and socket members for connecting said shafts, an auxiliary drive shaft, an auxiliary driven shaft, a magnetic clutch having ball and socket members for connecting said auxiliary shafts, a friction wheel carried by said first named drive shaft and arranged to engage said second named drive shaft, a friction wheel carried by said first named driven shaft, and arranged to be engaged by said second named driven shaft, means for energizing either of said magnetic clutches at will, said means comprising a magnetic coil carried by said drive shaft, the core of the coil being the drive shaft, the means for energizing said auxiliary magnetic clutch comprising a magnetic coil carried by the driven auxiliary shaft and arranged to magnetize the driven shaft.

4. A magnetic transmission gearing comprising a drive shaft, a driven shaft, a magnetic clutch for connecting said shafts having ball and socket members, an auxiliary drive shaft, an auxiliary driven shaft, a magnetic clutch for connecting said auxiliary shafts having ball and socket members, a friction wheel carried by said first named drive shaft and arranged to engage said second named drive shaft, a friction wheel carried by said first named driven shaft and arranged to be engaged by said second named driven shaft, means for energizing either of said magnetic clutches at will, said means comprising a magnetic coil carried by said drive shaft, the core of the coil being the drive shaft, the means for energizing said auxiliary magnetic clutch comprising a magnetic coil carried by the driven auxiliary shaft and arranged to magnetize the driven shaft, a source of current common to both of said magnets, and a switch for shifting the current connections from one magnet to another or to a neutral position at will.

JOHN T. RONAN.

Witnesses:
D. Prescott Cann,
Frank Fisher.

Copies of this patent may be obtained for five cents each, by addressing the "Commissioner of Patents, Washington, D. C."